United States Patent
Willey et al.

(10) Patent No.: US 11,610,484 B1
(45) Date of Patent: Mar. 21, 2023

(54) CONTROL SYSTEM FOR MAINTAINING ALIGNMENT OF MACHINE ON A TROLLEY ASSIST

(71) Applicant: Caterpillar Inc., Peoria, IL (US)

(72) Inventors: Christopher A. Willey, Oro Valley, AZ (US); Eric Ruth, Peoria, IL (US); Zachary Carter, Oro Valley, AZ (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 17/538,629

(22) Filed: Nov. 30, 2021

(51) Int. Cl.
| | |
|---|---|
| *G08G 1/095* | (2006.01) |
| *B62D 15/02* | (2006.01) |
| *G08B 21/18* | (2006.01) |
| *G01C 21/36* | (2006.01) |
| *B60M 1/12* | (2006.01) |

(52) U.S. Cl.
CPC ........... *G08G 1/095* (2013.01); *B62D 15/029* (2013.01); *G01C 21/3658* (2013.01); *G08B 21/18* (2013.01); *B60M 1/12* (2013.01)

(58) Field of Classification Search
CPC ..................................................... G08G 1/095
See application file for complete search history.

(56) References Cited

U.S. PATENT DOCUMENTS

| | | | | |
|---|---|---|---|---|
| 9,321,354 | B2* | 4/2016 | Saito | B60L 5/36 |
| 9,637,005 | B2* | 5/2017 | Hendrickson | B60L 9/00 |
| 2010/0253329 | A1 | 10/2010 | Arcaini et al. | |
| 2010/0322465 | A1* | 12/2010 | Wesche | B60M 1/28 |
| | | | | 348/125 |
| 2013/0018766 | A1* | 1/2013 | Christman | B60L 50/53 |
| | | | | 191/64 |
| 2015/0031306 | A1* | 1/2015 | Lundquist | H04B 3/54 |
| | | | | 455/66.1 |
| 2021/0188224 | A1* | 6/2021 | Barr | B61H 13/00 |
| 2022/0297574 | A1* | 9/2022 | Forestier | B60L 5/36 |

FOREIGN PATENT DOCUMENTS

| | | |
|---|---|---|
| CN | 16004456 B | 8/2018 |
| JP | 2005094952 A | 4/2005 |
| WO | WO2010121707 A1 | 10/2010 |

* cited by examiner

*Primary Examiner* — Travis R Hunnings
(74) *Attorney, Agent, or Firm* — Lee & Hayes, PLLC

(57) ABSTRACT

A system includes a support, a sensor coupled to the support and arranged to output signals in a direction towards a haul road on which a machine traverses, an indicator coupled to the support, a first line coupled to the support, and a second line coupled to the support. Sensor data is received from the sensor, and based on the sensor data, a position of the machine on the haul road is determined. An alignment of the machine on the haul road is determined, where the alignment is associated with the machine maintaining contact with the first line and the second line. An indication is displayed for laterally aligning the machine on the haul road.

20 Claims, 8 Drawing Sheets

CONTROL SYSTEM FOR MAINTAINING ALIGNMENT OF MACHINE ON A TROLLEY ASSIST

TECHNICAL FIELD

The present disclosure relates to systems and methods for maintaining an alignment of a machine on a trolley assist, and more particularly, to providing indications to an operator of the machine for maintaining contact between a trolley line attachment of the machine and one or more lines of the trolley assist.

BACKGROUND

Machines, such as mining trucks, loaders, dozers, or other construction and mining equipment, are frequently used for building, construction, mining and other activities. For example, mining trucks are often used for hauling mined materials from mining sites. Some types of mining trucks are hybrid-trucks that generate electric power with a generator driven by the engine and supply the electric power to rear wheel motors for driving the rear wheels.

With the increasing focus on sustainability, however, some mines employ trolley lines that at least partially power the mining trucks. For example, in uphill sections of the mines, the mining truck may include pantographs that contact trolley lines for receiving electrical power that is used in turn to power the mining truck. However, to receive the electrical power, the pantographs require contact with the trolley lines. As such, an operator of the mining trucks must navigate the mine while steering the mining truck along a proscribed path to maintain contact with the trolley lines. Such process is often tedious, results in operator fatigue, and is prone to operator error.

One attempt at maintaining an alignment on a trolley line is described in, for example, U.S. Pat. No. 9,637,005 (hereinafter "the '005 patent"). For example, the '005 patent describes a sensing and display system including one or more distance sensors. The sensors provide alignment-related information by sensing a distance to a side of a roadway, such as sensing roadside features. Therein, a display includes a position element providing an indication to an operator of an off-highway truck to align the off-highway truck with an overhead trolley line. However, the sensing and display system is located onboard the off-highway truck, which may increase a cost of machinery, a complexity in determining a position of the off-highway truck, and/or result in damage to the sensing and display system. For example, off-highway trucks are often exposed to harsh conditions that may degrade the sensing and display system. Moreover, the display of the '005 patent is internal to the off-highway truck, and the operator is required to remove their attention from the road observe the sensing and display system.

Examples of the present disclosure are directed toward overcoming one or more of the deficiencies noted above.

SUMMARY

According to a first aspect, a system comprises a support, a sensor coupled to the support and disposed above a haul road on which a machine is disposed, an indicator coupled to the support, a first power line coupled to the support, a second power line coupled to the support and spaced from the first power line, the first power line and the second power line being suspended above the haul road, one or more processors, and non-transitory computer-readable media storing instructions that, when executed by the one or more processors, cause the one or more processors to perform operations. The operations may include receiving sensor data from the sensor, determining, based at least in part on the sensor data, a position of the machine on the haul road, determining, based at least in part on the position, whether a power component of the machine is in contact with the first power line and the second power line, based at least in part on determining whether the power component is in contact with the first power line and the second power line, selecting an alignment indication indicative of a desired lateral movement of the machine along the haul road, and causing output of the alignment indication by the indicator.

According to a further aspect, a method comprises receiving sensor data indicative of a machine traveling along a road, determining, based at least in part on the sensor data, a first position of the machine on the road, the machine having a trolley assist attachment configured to contact a first line and a second line of a trolley assist positioned along the road, determining at least one of a second position of the first line or a third position of the second line, determining, based at least in part on the first position and the at least one of the second position or the third position, an indication to be output on an indicator positioned along the road, and causing output of the indication on the indicator.

According to a further aspect, a system comprises one or more processors and one or more non-transitory computer-readable media storing instructions that, when executed by the one or more processors, cause the one or more processors to perform operations. The operations may include receiving sensor data indicative of a machine traveling along a road, determining, based at least in part on the sensor data, a first position of the machine on the road, the machine having a trolley assist attachment configured to contact a first line and a second line of a trolley assist positioned along the road, determining a second position indicative of a central position between the first line and the second line, and determining, based at least in part on the first position and the second position an indication to be output on an indicator positioned along the road.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features. The systems depicted in the accompanying figures are not to scale and components within the figures may be depicted not to scale with each other.

DETAILED DESCRIPTION

Wherever possible, the same reference numbers will be used throughout the drawings to refer to the same or like parts.

Figure 1:
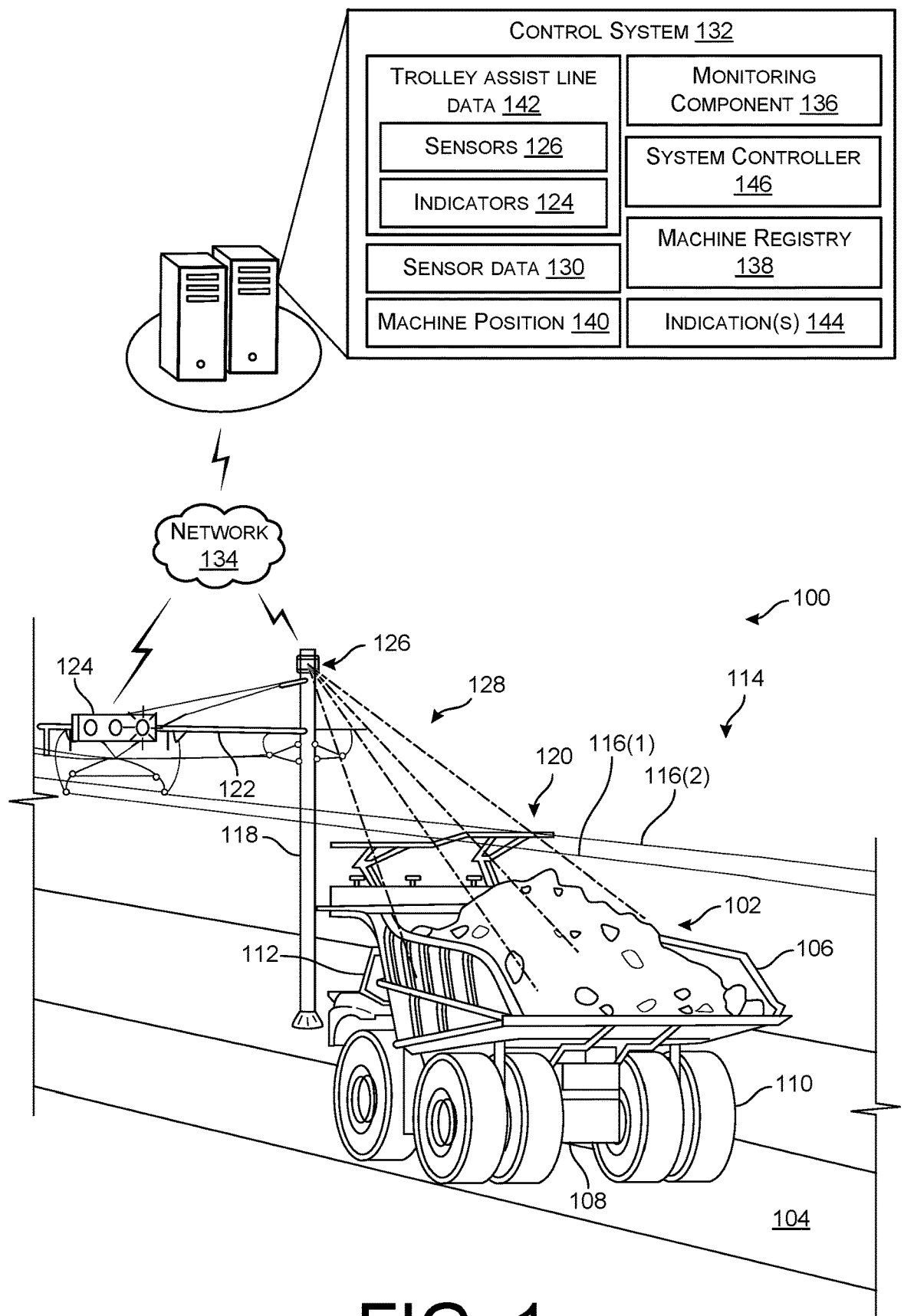
FIG. 1 illustrates an example environment in which a trolley assist supplies electricity to a machine, according to an embodiment of the present disclosure.

FIG. 1 is an example environment 100 that includes a machine 102 traveling along a section of a haul road 104, in accordance with examples of the disclosure. Although the machine 102 is depicted as a type of haul truck, the machine 102 includes any suitable machine, such as a dump truck, earth mover, or the like. The machine 102 is configured, for example, to move mined materials (e.g., ore), soil, overburden, heavy construction materials, and/or equipment for road construction, building construction, other mining, paving and/or construction applications. For example, the machine 102 is used in instances where materials, such as mineral ores, loose stone, gravel, soil, sand, concrete, and/or other materials need to be transported to or from a worksite.

The machine 102 is configured to carry such materials in, for example, a dump box 106. The machine 102 includes a frame 108 that supports the dump box 106 and wheels 110 operably coupled to the frame 108. The frame 108 is constructed from any suitable materials, such as iron, steel, aluminum, or other metals. The frame 108 is of a unibody construction in some cases, and in other cases, is constructed by joining two or more separate body pieces. Parts, or components, of the frame 108 are joined by any suitable variety of mechanisms, including, for example, welding, bolts, screws, other fasteners, epoxy, combinations thereof, or the like. The wheels 110 are mechanically coupled to a drive train (not shown) to propel the machine 102 along the haul road 104. Although illustrated in FIG. 1 as having a hub with a rubber tire, in other examples, the wheels 110 are replaced by drums, chain drives, tracks, combinations thereof, or the like.

The machine 102 also includes a cabin or other operator station 112. The operator station 112 is configured to seat an operator (not shown) therein. The operator seated in the operator station 112 interacts with various control interfaces and/or actuators (e.g., steering wheel, levers, joysticks, etc.) to control movement of the machine 102 and/or various components of the machine 102, such as raising and lowering the dump box 106. However, in some instances, the machine 102 is remotely controlled.

In some instances, the machine 102 represents a diesel-electric machine that includes an engine of any suitable type, size, power output, etc. When powered, the engine drives an electric generator. Electricity generated from the generator powers electric motors of the machine 102. The electric motors are coupled to the wheels 110 and cause the wheels 110 to rotate, via the drive train, to enable the machine 102 to traverse the environment 100. The engine is therefore mechanically coupled to the electric motors and the electric motors are mechanically coupled to a variety of drive train components, such as a drive shaft and/or axles, to rotate the wheels 110 and propel the machine 102. In some instances, the drive train includes any variety of other components including, but not limited to a differential, connector(s), constant velocity (CV) joints, etc. Additionally, even though the machine 102 is described as including a diesel engine, the machine 102 may represent other internal combustion engine that uses combustible hydrocarbons (e.g., liquified natural gas), cryogenic fuels (e.g., hydrogen), and so forth. In such instances, the machines are configured to be at least partially powered via the trolley assist 114.

Additionally, or alternatively, the machine 102 is powered via external power, such as power supplied by a trolley assist 114. In such instances, the machine 102 transitions between being powered via the onboard engine and the trolley assist 114. For example, as shown in FIG. 1, the machine 102 is traversing an uphill section of the haul road 104. Along the uphill section of the haul road 104, the trolley assist 114 delivers electricity to the machine 102 to at least partially power the machine 102. In other words, instead of generating electricity from the onboard engine to drive the wheels 110, electricity is supplied from the trolley assist 114 to drive the electric motors of the machine 102.

Although the trolley assist 114 is described as powering electric motors to drive the wheels 110 during the uphill section of the haul road 104, electricity delivered to the machine 102 via the trolley assist 114 may be used to power other systems of the machine 102. For example, the electricity received from the trolley assist 114 may power hydraulic pumps (e.g., steering), air conditioners, displays, and so forth located onboard the machine 102. Still, in some instances, the electricity is used to charge batteries located onboard the machine 102.

As shown, the trolley assist 114 is located along the uphill section of the haul road 104 given the increased demand of the machine 102 to traverse the uphill section. When loaded with material, and as the machine 102 travels uphill, the machine 102 consumes the greatest amount of energy compared to other sections of the haul road 104 (e.g., flat, downhill, etc.). However, the trolley assist 114 may also be disposed along other sections of the haul road 104. For example, even though the trolley assist 114 is shown disposed along the uphill section of the haul road 104, the trolley assist 114, or other trolley assists, are located elsewhere. As an example, a trolley assist may be positioned on a downhill section of the haul road 104 to recover the energy generated from the machine 102 braking. Additionally, the trolley assist 114 may be disposed around corners, switchbacks, and the like.

The trolley assist 114 includes an infrastructure to deliver power to the machine 102. For example, the trolley assist 114 includes one or more respective power delivery lines, such as a first line 116(1) and a second line 116(2) (such power delivery lines are referred to collectively herein as "lines 116"). The lines 116 represent direct current (DC) lines, wires, cables, conductors, and the like that are disposed overhead of the machine 102, above the haul road 104. The lines 116 include one negatively charged line (e.g., the first line 116(1)) and one positively charged line (e.g., the second line 116(2)). The lines 116 form a catenary to supply electricity to the machine 102. For example, the lines 116 span between a plurality of supports or poles 118 that are spaced apart from one another along the haul road 104 and the poles 118 serve to vertically dispose the lines 116 above the haul road 104. In some instances, the poles 118 are spaced apart from one another by approximately forty meters (m) along the haul road 104. However, the poles 118 may be placed closer together or farther apart from one another to maintain a suitable arc in the lines 116.

The machine 102 is shown including a trolley assist attachment 120 (or power delivery component) that engages with the lines 116 to transfer electricity from the trolley assist 114 to the machine 102. Generally, and as explained in further detail with regard to FIG. 2, the trolley assist attachment 120 represents a pair of scissor-like or extendable arms that deploy during the uphill section of the haul road 104 (or along other sections of the haul road 104 containing the trolley assist 114). For example, the trolley assist attachment 120 extends to contact the lines 116 and transfer electricity from the lines 116 to the machine 102. In turn, this electricity is used to power the electric motors of the machine 102, or stated alternatively, when connected to the lines 116, the electric motors of the machine 102 are powered with electricity received from the trolley assist 114. In some instances, the electricity is directed to one or more batteries located onboard the machine 102 for storage. When the trolley assist attachment 120 is connected to the trolley assist 114, the engine may be powered off or reduced to an idle state.

The poles 118 are shown positioned beside the haul road 104, such as immediately to the side of the haul road 104. The poles 118 include a cantilever 122, such as an arm, bar, post, and the like that extends out and over the haul road 104. The cantilever 122 couples the lines 116 between the poles 118 along the section of the haul road 104, and positions the lines 116 away from the poles 118 such that the trolley assist attachment 120 is able to contact the lines 116. In addition, an indicator 124 is disposed on the cantilever 122. The indicator 124 may represent a display, such as a liquid crystal display (LCD), a light emitting diode (LED) display, and the like. In other instances, the indicator 124 represent a plurality of lights that are configured to emit light at different colors, different patterns, in different sequences, and so forth.

The indicator 124 outputs visual indications to the operator of the machine 102 indicative of an alignment of the trolley assist attachment 120 on the trolley assist 114, or more generally, an alignment of the machine 102 on the haul road 104. For example, if the machine 102 is not aligned on the haul road 104, the indicator 124 provides an indication or other notification for steering the machine 102 such that the machine 102 is aligned on the haul road 104. During this process, the trolley assist attachment 120 correspondingly aligns on the trolley assist 114, or between the first line 116(1) and the second line 116(2). For example, the trolley assist attachment 120 may be centered on the first line 116(1) and the second line 116(2).

To sense the position of the machine 102 on the haul road 104, a sensor 126 is disposed on the pole 118. As shown, the sensor 126 is disposed atop the pole 118, however, in some instances, the sensor 126 is disposed at other locations, such as on the cantilever 122, lower on the pole 118, beside the section of the haul road 104, and so forth. In some instances, the sensor 126 represents a LIDAR sensor that emits light waves, such as signals 128, into the environment 100 and in a direction towards the haul road 104. The signals 128 bounce or reflect off surrounding objects in the environment 100, such as the machine 102, and signals (e.g., returned light waves) are received by the sensors 126. The returned signals are used to determine a position (or location) of the machine 102 along the haul road 104. As will be explained in further detail herein, the position of the machine 102 is utilized to ensure that the trolley assist attachment 120 maintains contact with the trolley assist 114. That is, for the machine 102 to receive electricity from the trolley assist 114, the trolley assist attachment 120 necessitates contact with the trolley assist 114.

Based on the position of the machine 102, the indicator 124 outputs visual indications such as arrows (leftward facing arrow, rightward facing arrow, straight arrow, etc.), text (e.g., steer left, steer right, proceed straight, etc.), lights associated with steering the machine 102 (e.g., illuminate left-most light to steer left), and so forth. Based on these indications, the operator of the machine 102 correspondingly responds and steers the machine 102 along the section of the haul road 104. Such process is continuous and the sensor 126 monitors the machine 102 along a length of the haul road 104 to ensure that the trolley assist attachment 120 maintains contact with the trolley assist 114.

The sensor 126 generates sensor data 130 that is transmitted to a control system 132 via a network 134. The control system 132 includes components that determine a position of the machine 102 and compares (e.g., references) the position of the machine 102 to a position of the trolley assist 114 (or components thereof). In turn, based on the position of the machine 102, the control system 132 determines a steering of the machine 102 in order to maintain contact between the trolley assist attachment 120 and the trolley assist 114. An indication of the steering is output on the indicator 124 for observation by the operator.

The control system 132 is shown including a monitoring component 136 that monitors the position of the machine 102 and compares the position of the machine 102 with a known position of the trolley assist 114. For example, the monitoring component 136 receives the sensor data 130 and in response, determines a distance from the sensor 126 to the machine 102 as well as characteristic(s) of the machine 102, such as a height of the machine 102, a length of the machine 102, a width of the machine 102, a shape of the machine 102, and so forth. Such characteristic(s) are determined via the returned light signals to the sensor 126. In some instances, knowing the characteristic(s) of the machine 102 allows for the monitoring component 136 to determine a type of the machine 102. For example, based on the height and/or the width of the machine 102, the monitoring component 136 compares such characteristic(s) with values stored in a machine registry 138. In the machine registry 138, characteristics of machines 102 are stored (e.g., height, width, length, etc.). In addition, the machine registry 138 may also indicate other characteristic(s) of the machine 102, such as wheel base, tire size, shape, and the like. Such characteristic(s) are compared to features extracted from the sensor data 130 and based on the sensor data 130, the monitoring component 136 is able to determine a type of the machine 102 and/or further characteristic(s) of the machine 102.

Upon determining the type of the machine 102, the monitoring component 136 determines characteristic(s) of the trolley assist attachment 120. For example, characteristic(s) of the trolley assist attachment 120 may be stored in association with the machines 102 in the machine registry 138. Here, the characteristic(s) of the trolley assist attachment 120 indicate a width of the trolley assist attachment 120, where the trolley assist attachment 120 is located on the machine 102, and so forth. Knowing such characteristic(s) of the trolley assist attachment 120 allows for the monitoring component 136 to determine how to steer the machine 102 to maintain an alignment on the haul road 104. For example, different machines 102 include different trolley assist attachments 120, and compared to one another, and the trolley assist attachments 120 have different characteristic(s).

Knowing such characteristic(s) permits the monitoring component 136 to determine how to steer the machine 102 such that the machine 102 maintains and alignment on the haul road 104.

As part of this process, the monitoring component 136 also determines a machine position 140. The machine position 140 indicates a position in coordinate space of the machine 102, relative to the haul road 104, the poles 118, and/or the trolley assist 114 (or components thereof). For example, knowing the width of the machine 102 (via the machine registry 138), the monitoring component determines a central position of the machine 102. The central position may be determined based on knowing the characteristic(s) of the machine 102, whether determined via accessing the machine registry 138 or using the sensor data 130. Once the machine position 140 is determined, the machine position 140 is compared against parameters of the trolley assist 114. For example, the control system 132 stores or otherwise has access to trolley assist data 142. The trolley assist data 142 may include, without limitation, a length of the trolley assist 114 within the environment 100, a location of the trolley assist 114, a spacing between the first line 116(1) and the second line 116(2), a location of the first line 116(1) and/or the second line 116(2), a distance between the sensor 126 and the first line 116(1) and the second line 116(2), and so forth. The trolley assist data 142 is used, in some instances, to determine a location of the first line 116(1) and the second line 116(2) such that the trolley assist attachment 120 maintains contact with the first line 116(1) and the second line 116(2). The trolley assist data 142 may also indicate coordinate positions of the trolley assist 114.

To illustrate, in determining the machine position 140, the monitoring component 136 determine whether the machine position 140 is different than a known position of the first line 116(1) and the second line 116(2). This includes, in some instances, determining X, Y, and/or Z coordinate positions of the machine position 140 and X, Y, and/or Z coordinate positions of the first line 116(1) and the second line 116(2). Additionally, or alternatively, coordinate positions of the machine position 140 may be referenced against a central point between the first line 116(1) and the second line 116(2). Here, this may indicate whether the machine 102 is centered on the trolley assist 114, or centered between the first line 116(1) and the second line 116(2). In other cases, however, the trolley assist 114 is not centered on the machine 102, and the trolley assist attachment 120 is centered between the first line 116(1) and the second line 116(2). Such positioning comes by way of knowing the location of the trolley assist attachment 120 on the machine 102 (via the machine registry 138).

Through a difference between the machine position 140 and that of the first line 116(1) and the second line 116(2), the monitoring component 136 determines how the machine 102 should be steered to maintain alignment with the trolley assist 114. For example, if the machine position 140 is veering to the left of the trolley assist 114, the monitoring component 136 determines that the machine 102 needs to be steered right. This steering, for example, recenters the trolley assist attachment 120 on the trolley assist 114, or the machine 102 on the haul road 104. As such, a comparison of coordinates of the machine position 140 and that of the first line 116(1) and the second line 116(2), indicates a steering of the machine 102 to maintain alignment on the haul road 104 for receiving electricity from the trolley assist 114.

The trolley assist data 142 is shown including data related to the sensors 126 as well as the indicators 124. Such information indicates the location of the sensors 126 and the indicators 124 along the trolley assist 114. This information is used by the monitoring component 136 to determine the machine position 140, or which sensor 126 along the haul road 104 generated the sensor data 130 indicative of the machine 102 on the haul road 104. For example, the sensor data 130 may be labeled with a respective sensor 126 that generated the sensor data 130.

Moreover, such information is used by the monitoring component 136 when determining indications 144 to be output on the indicator 124. Along the haul road 104, the trolley assist 114 includes a plurality of indicators 124, and the monitoring component 136 determines which indicator 124 is to output the indication 144 for how to steer the machine 102. For example, continuing with the above example, if the machine 102 is veering to the left, the monitoring component 136 determines to output an indication 144 for steering the machine 102 right. In other words, the monitoring component 136 determines whether the machine 102 is veering off course from a reference point associated with the trolley assist 114. This indication 144 includes, for example, illuminating certain lights on the indicator 124, outputting scrolling text on a display, static images, dynamic images, videos, and so forth. As shown in FIG. 1, for example, a right-most light on the indicator 124 is illuminated, signaling to operator to steer right. In response, the operator steers the machine 102 to the right. Such indication 144 is transmitted to the indicator via the network 134, one or more intermediary devices (e.g., the sensor 126), and so forth. The monitoring component 136 selects the indicator 124 shown in FIG. 1 for instructing the operator how to steer, as compared to other indicators along the haul road 104, given the position of the machine 102 adjacent to the indicator 124.

The monitoring component 136 continuously and routinely determines the machine position 140. For example, after outputting the indication 144 for the operator to steer right, the monitoring component 136 receives additional sensor data 130. The monitoring component 136 then determines the machine position 140 and determines a steering of the machine 102. In response, the indicator 124 outputs another indication 144. For example, if the machine 102 corrects and steers right, and the monitoring component 136 determines that the machine 102 is centered on the trolley assist 114, the indicator 124 illuminates a middle light of the indicator 124. Here, the indication 144, such as illuminating the middle light of the indicator 124, prompts the operator to continue driving straight. The monitoring component 136 therefore determines the indications 144 to be output as the machine 102 travels along the length of the haul road 104. However, the indicators 124 shown in FIG. 1 are merely illustrative and other indications 144 may be output for instructing the operator.

In some instances, the indications 144 are output based on the machine 102 being outside a certain desired range associated with an alignment of the machine 102 on the trolley assist 114. For example, the machine 102 has a certain degree of freedom to maneuver laterally on the haul road 104 and maintain contact between the trolley assist attachment 120 and the trolley assist 114. In other words, the trolley assist attachment 120 has some degree of lateral movement to maintain contact with the first line 116(1) and the second line 116(2). Even though the trolley assist attachment 120 is not centered between the first line 116(1) and the second line 116(2), or the machine 102 is not centered on the haul road 104, the monitoring component 136 determines that the machine 102 is within a certain desired range. In other words, if the machine position 140 is outside of a certain acceptable range, or certain thresholds, the monitoring component 136 determines that the machine 102 is misaligned with the trolley assist 114. As such, the positioning of the machine 102 along the haul road 104 does not need to be exact, but a certain amount of freedom is afforded to the operator to maintain contact with the first line 116(1) and the second line 116(2).

The control system 132 is further shown including a system controller 146, which may perform the operations of the control system 132 described above, including the operations of the monitoring component 136, and/or other operations related to the control system 132. The system controller 146 may include multiple processors and/or a processor having multiple cores. In such instances, the processor(s) may comprise one or more cores of different types. For example, the processor(s) may include application processor units, graphic processing units, and so forth. In one implementation, the processor(s) may comprise a microcontroller and/or a microprocessor. The processor(s) may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that may be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) may possess its own local memory, which also may store program components, program data, and/or one or more operating systems.

The system controller 146 further has access to memory, which may store data or other information of the control system 132, such as the trolley assist data 142, the sensor data 130, etc. The memory may include volatile and nonvolatile memory, removable and non-removable media implemented in any method or technology for storage of information, such as computer-readable instructions, data structures, program component, or other data. Such memory may include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory may be implemented as computer-readable storage media ("CRSM"), which may be any available physical media accessible by the processor(s) to execute instructions stored on the memory. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

In some instances, the control system 132 is implemented as one or more servers and, in some instances, forms a portion of a network-accessible computing platform implemented as a computing infrastructure of processors, storage, software, data access, and so forth that is maintained and accessible via the network 134 such as the Internet. Cloud-based systems may not require end-user knowledge of the physical location and configuration of the system that delivers the services. Common expressions associated for the control system include "on-demand computing", "software as a service (SaaS)", "platform computing", "network-accessible platform", "cloud services", "data centers", and so forth.

Although the discussion herein relates to the control system 132 communicating with the indicator 124 and the sensor 126 over the network 134, in some instances, the control system 132 may be located on the pole 118 or disposed in the environment 100. In such instances, processing of the sensor data 130, determining the indications 144 to be output, as well as other operations may be performed locally within the environment 100, such as by computing devices, controllers, and the like disposed on the pole 118 or adjacent to the haul road 104.

The network 134 is representative of any type of communication network, including data and/or voice network, and may be implemented using wired infrastructure (e.g., cable, CAT5, fiber optic cable, etc.), a wireless infrastructure (e.g., RF, cellular, microwave, satellite, Bluetooth, etc.), and/or other connection technologies. The control system 132 and the sensors 126 include one or more network interface(s) for permitting communication over the network 134.

The trolley assist 114 therefore provides electricity to the machine 102 along certain portions of the haul road 104. The indicators 124 positioned along the haul road 104 provide assistance to maintain an alignment of the machine 102 on the trolley assist 114. In doing so, the use of the trolley assist 114 results in reduced fuel consumption of the machine 102 and reduced emissions produced by the machine 102. This leads to increased production and a reduced number of machines due to higher speed of the machines on the trolley assist 114. Additionally, because of the reduced fuel consumption and load on the engines during the uphill section of the haul road 104, the engines are exposed to less wear, which results in an increased lifespan of the engine.

Figure 2:
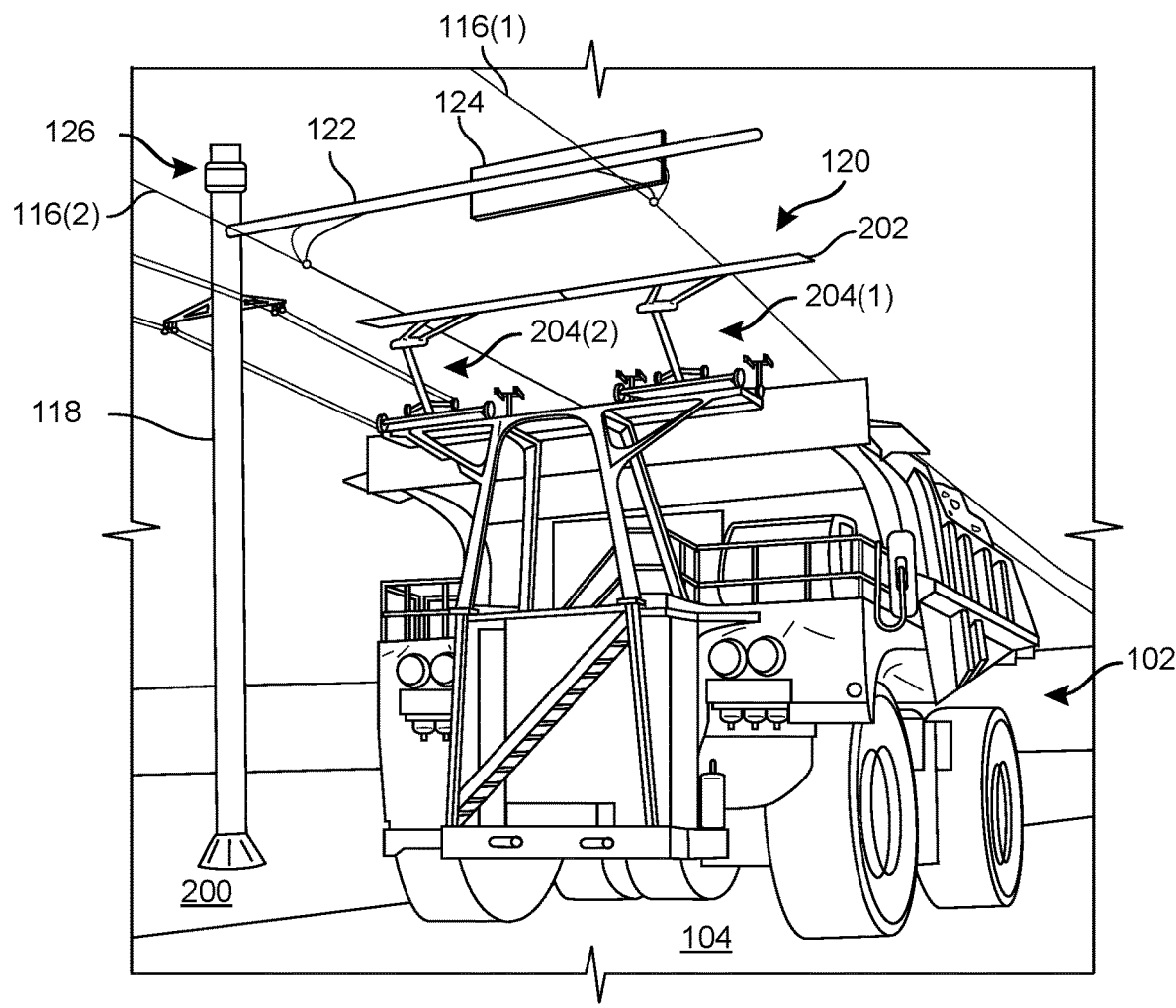
FIG. 2 illustrates an example trolley assist attachment of a machine that contacts a trolley assist, according to an embodiment of the present disclosure.

FIG. 2 illustrates additional details of the trolley assist 114 and the trolley assist attachment 120. As introduced above, the pole 118 extends from a ground surface 200, adjacent to the haul road 104, and extends upward, in a vertical direction. The cantilever 122 extends from the pole 118 and is positioned overhead of the haul road 104. In some instances, the cantilever 122 mounted to the pole 118 extends approximately ¼ of the way over the haul road 104.

The lines 116, such as the first line 116(1) and the second line 116(2), are shown coupled to the cantilever 122. The first line 116(1) and the second line 116(2) hang from the cantilever 122 for positioning the first line 116(1) and the second line 116(2) away from the cantilever 122. In some instances, the first line 116(1) and the second line 116(2) hang from the cantilever 122 via bars, cables, hangers, and the like. Such hangers, from example, may be glass, porcelain, or composite polymer materials to insulate the first line 116(1) and the second line 116(2) from other portions of the trolley assist 114. Additionally, the hangers serve to space the first line 116(1) and the second line 116(2) apart from the cantilever 122 and the indicator 124 for contact by the trolley assist attachment 120. The cantilever 122 also disposes the first line 116(1) and the second line 116(2) away from the pole 118. Additionally, the indicator 124 is shown coupled to the cantilever 122 for assisting an operator of the machine 102 as to an alignment of the machine 102 on the haul road 104.

In some instances, the trolley assist attachment 120 includes one or more sliding segment(s) 202 that contact the lines 116. The sliding segment(s) 202 slide along the lines 116 as the machine 102 traverses the section of the haul road 104. In some instances, the sliding segment(s) 202 is actuated by a first pantograph 204(1) and/or a second pantograph 204(2) (referred to collectively herein as the "pantographs 204"). Collectively, the pantographs 204 support the sliding segment(s) 202 overhead of the machine 102 in an extended state (as shown in FIG. 2). The trolley assist attachment 120 includes biasing members that bias the sliding segment(s) 202 upwards such that the sliding segment(s) 202 maintain contact with the lines 116 as the machine 102 traverses along the haul road 104. In doing so, the sliding segment(s) 202 are configured to respond to vertical changes along the haul road 104. In some instances, the sliding segment(s) 202 include two sliding segments, where a first sliding segment engages with the first line 116(1) and a second sliding segment engages with the second line 116(2). The first sliding segment may be insulated or separate from the second sliding segment. For example, the first sliding segment engages with or contacts a negatively charged line (e.g., the first line 116(1)), while the second sliding segment engages with or contacts a positively charged line (e.g., the second line 116(2)). In some instances, the first sliding segment and the second sliding segment are independently actuatable to raise and lower, or may be collectively raised and lowered.

Actuation of the trolley assist attachment 120 may come by way of hydraulic or pneumatic mechanisms. For example, from a retracted state to an extended state, hydraulics or pneumatics actuate to bring the sliding segment(s) 202 into contact with the lines 116. The sliding segment(s) 202 remain in an extended state along a duration of the trolley assist 114. Conversely, from the extended state to a retracted state, the hydraulics or pneumatics retract to bring the sliding segment(s) 202 out of contact with the lines 116. Although not shown, the trolley assist attachment 120 includes electrical wiring for routing electricity from the lines 116 to the electric motors of the machine 102.

In some instances, the operator of the machine 102 actuates the trolley assist attachment 120 between the extended state and the retracted state. For example, when approaching the trolley assist 114, the operator causes actuation of the trolley assist attachment 120 to the extended state via pressing a button or engaging with an interface inside the operator station 112. In other instances, the trolley assist attachment 120 automatically deploys based on sensing a location underneath the trolley assist 114.

As introduced above, along the trolley assist 114, the sliding segment(s) 202 is permitted a limited amount of movement to maintain contact with the lines 116. In other words, the sliding segment(s) 202 (or more generally the machine 102) is required to maintain a particular course along the haul road 104 such that the sliding segment(s) 202 contacts the lines 116. For example, in some instances, the sliding segment(s) 202 may have one meter of lateral movement to maintain contact with the lines 116. In some instances, the sliding segment(s) move with the machine 102. However, if the machine 102 veers off course, for example, the sliding segment(s) 202 lose contact with at least one of the first line 116(1) or the second line 116(2). As a result, electricity is not supplied from the lines 116 to the machine 102. As such, in an effort to maintain contact between the sliding segment(s) 202 and the lines 116, the sensor 126 generates the sensor data 130 indicative of at least one of a position of the machine 102 on the haul road 104, a position of the machine 102 relative to the trolley assist 114, a position of the machine 102 relative to the lines 116, and/or a position of the trolley assist attachment 120 relative to the trolley assist 114. Based on the determined position, the indicator 124, or other indicators in a line of sight of the operator, display indications 144 that are used by the operator to steer the machine 102.

Therefore, in FIG. 2, the machine 102 includes the trolley assist attachment 120 for contacting the lines 116 of the trolley assist 114. The sensors 126 are arranged to determine a position of the machine 102 along the haul road 104 such that the trolley assist attachment 120 maintains contact with the trolley assist 114. In instances where the machine 102 is misaligned, the indicators 124 output indications 144, such as visual cues, that prompt the operator of the machine 102 as to steering directions. As such, the machine 102 take advantage of electricity supplied via the trolley assist 114 along portions of the haul road 104.

Figure 3:
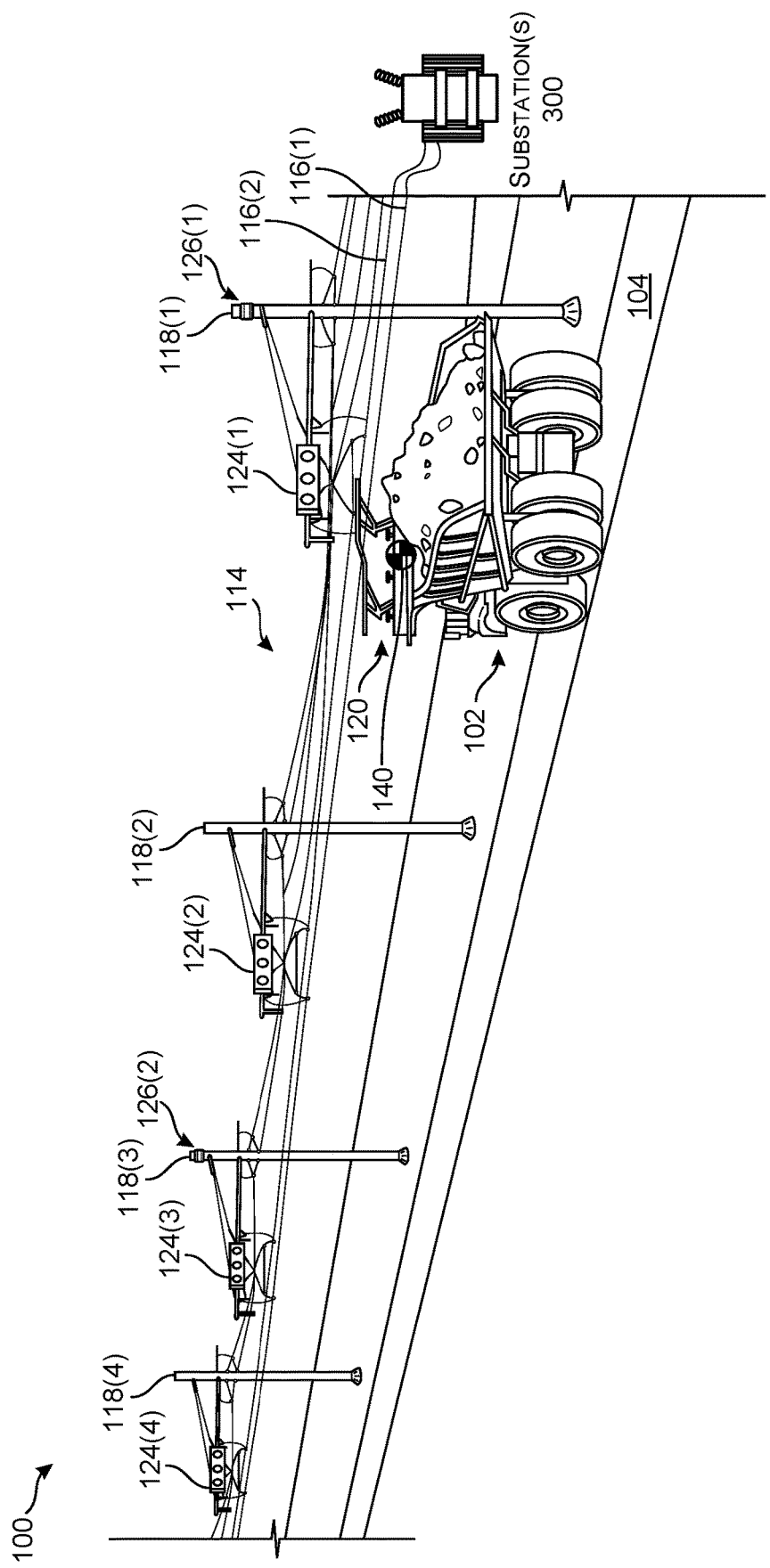
FIG. 3 illustrates example components of a trolley assist that supplies electricity to a machine, according to an embodiment of the present disclosure.

FIG. 3 illustrates additional details of the trolley assist 114. As discussed above in FIGS. 1 and 2, the trolley assist 114 includes lines 116, such as the first line 116(1) and the second line 116(2). The lines 116 are shown spanning between a plurality of poles 118, such as a first pole 118(1), a second pole 118(2), a third pole 118(3), and a fourth pole 118(4). However, the number of poles 118 is merely illustrative and the environment 100, in other instances, includes more than or less than the number of poles shown in FIG. 3.

The poles 118 each include a cantilever that extends out and over the haul road 104. The cantilevers respectively couple the lines 116 between the poles 118 along the section of the haul road 104, and position the lines 116 away from the poles 118 such that the trolley assist attachment 120 contacts the lines 116. In addition, indicators 124 are disposed on the cantilevers. For example, the first pole 118(1) is shown including a first indicator 124(1), the second pole 118(2) is shown including a second indicator 124(2), the third pole 118(3) is shown including a third indicator 124(3), and the fourth pole 118(4) is shown including a fourth indicator 124(4). However, in some instances, the indicators 124 may not be disposed on all the poles 118, such as every other pole, for example.

To sense the position of the machine 102 on the haul road 104, the sensors 126 are disposed on the poles 118. In some instances, each of the poles 118 includes a respective sensor 126. Additionally, or alternatively, some of the poles 118 may include a sensor 126 while other poles 118 may not include a sensor 126. For example, a first sensor 126(1) is shown coupled to the first pole 118(1) a second sensor 126(2) is shown coupled to the third pole 118(3). In such instances, the second pole 118(2) and the fourth pole 118(4) may not include a sensor 126. However, whether the poles 118 include a sensor may be based at least in part on a distance interposed between the poles 118 and/or area monitored by the sensor 126.

As the machine 102 traverses the haul road 104, the sensors 126 respectively generate sensor data 130 that is sent to the control system 132. As discussed above in FIG. 1, the sensor data 130 is used to determine a position of the trolley assist attachment 120 relative to the first line 116(1) and the second line 116(2), or more generally, a position of the machine 102 relative to the trolley assist 114 or on the haul road 104. Such positioning is used to provide the indications 144 to the operator as to how to steer the machine 102 along the haul road 104. For example, as the machine 102 traverses the haul road 104, the second indicator 124(2) outputs an indication 144 for steering the machine 102, the third indicator 124(3) outputs an indication for steering the machine 102, and so forth.

In some instances, and as explained herein, the sensors 126 may include a respective zone or region of interest. For example, the second sensor 126(2) may be arranged to output the signals 128 between the third pole 118(3) and the first pole 118(1). In this scenario, the second sensor 126(2) is arranged to monitor a region of interest that spans between multiple poles 118. Additionally, the first sensor 126(1), for example, may monitor a region of interest between the first pole 118(1) and one or more previous poles on the haul road 104. A third sensor, for example, may monitor a region of interest between a fifth pole and the third pole 118(3). As the signals 128 are reflected off objects in the environment 100, the second sensor 126(2) receives the reflected signals and generates the sensor data 130. The sensor data 130 is transmitted to the control system 132 for processing. However, as noted above, such processing may be performed locally (e.g., via a device on the poles 118).

Along the haul road 104, the sensors 126 are therefore arranged to monitor regions of interest. In some instances, the sensors 126 are disposed on each pole 118 for monitoring a region of interest between adjacent poles, or the sensors may be arranged on every other pole 118, for example, to monitor multiple regions of interest that span multiple poles 118. The number of sensors 126 used, however, may be based on the trajectory or length of the haul road 104. For example, on turns, sensors 126 may be disposed on each of the poles 118 to more actively monitor the steering of the machine 102 around the turn.

Moreover, the indicators 124 are configured to display the indications based on the machine position 140. For example, in FIG. 3, the second indicator 124(2) outputs an indication 144 for steering the machine 102. However, as the machine 102 approaches the second indicator 124(2), the second indicator 124(2) becomes obstructed and the operator is no longer able to view the indication 144. Here, instead, the third indicator 124(3) outputs an indication for steering the machine 102. As such, the machine position 140 is used to determine a line of sight of the operator, which in turn, is used to select which indicator 124 displays the indication 144 to the operator. That is, based on the machine position 140, the control system 132 may determine which indicator 124 is to output the indication 144. More than one indicator 124 may be selected for outputting the indication 144.

Substation(s) 300 couple to the lines 116 for providing electricity. The substation(s) 300 include one or more alternative current (AC) substations and/or one or more DC substation(s). The AC substation shapes AC power from the local power grid for use by smaller DC substations along the trolley assist 114. The DC substations are fed by the AC substations and convert the AC power into DC power. In some instances, the DC substations are placed approximately every kilometer (km) along the trolley assist 114. The amount of DC substations varies depending on a length of the trolley assist 114, a number of machines receiving electricity from the trolley assist 114, a grade of the haul road 104 along which the trolley assist 114 is disposed, and so forth. The lines 116 are connected to the DC substations for delivering DC to the lines 116. In some instances, the substation(s) 300 are located within the environment 100 or remote from the environment 100.

The poles 118 are therefore arranged along the haul road 104 with the lines 116 spanning therebetween. The indicators 124 output the indications 144 as the machine 102 traverses the haul road 104. In doing so, the operator of the machine 102 steers the machine 102 to maintain contact between the trolley assist attachment 120 and the trolley assist 114.

Figure 4:
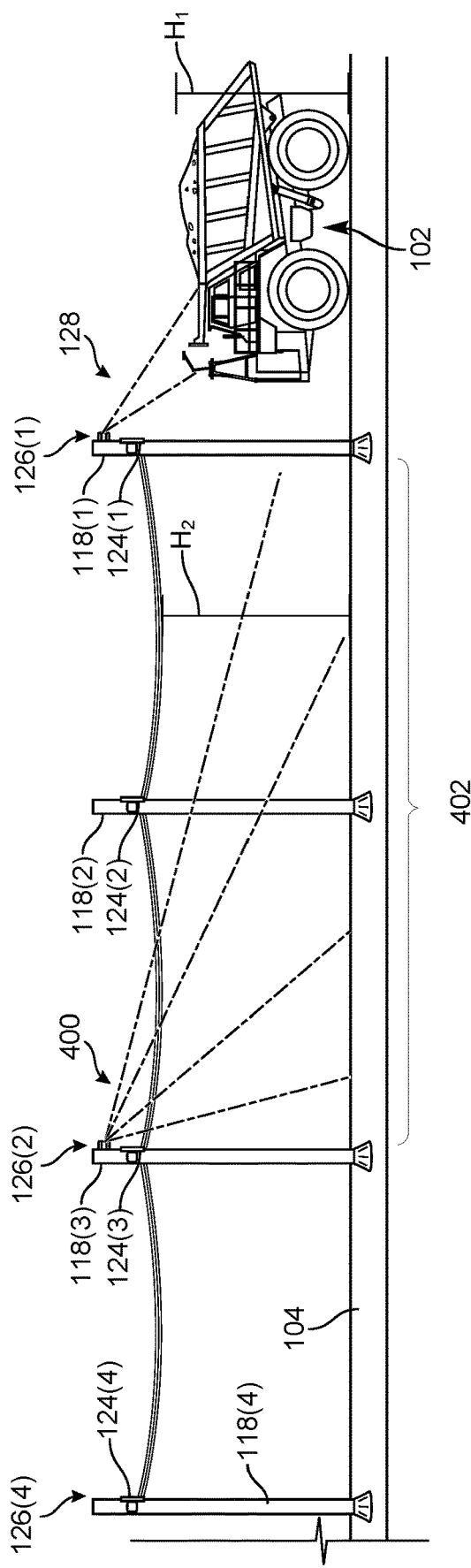
FIG. 4 illustrates example components of a trolley assist for determining a position of a machine, according to an embodiment of the present disclosure.

FIG. 4. Illustrates a side view of the machine 102 the haul road 104. The machine 102 is shown positioned before the first pole 118(1) and before entering a section of the haul road 104 along which the trolley assist 114 is disposed.

In some instances, the first sensor 126(1) determines whether a height $H_1$ of a load carried by the machine 102 is less than a threshold height $H_2$ associated with the machine 102 passing underneath the lines 116. For example, once loaded with material, the machine 102 has the height $H_1$ (height of machine 102 and height of material). Before the first pole 118(1) and a start of the trolley assist 114 (or before entering an area underneath the trolley assist 114), the first sensor 126(1) generates sensor data 130 indicative of a pile height on the machine 102. For example, the first sensor 126(1) may determine the height $H_1$ based on the signals 128. Such sensor data 130 is transmitted to the control system 132 for use in determining whether the height $H_1$ is below a height $H_2$ of the lines 116.

In response, the control system 132 determines whether the height $H_1$ is less than, or greater than, the height $H_2$ of the lines 116. If the height $H_1$ is less than the height $H_2$ of the lines 116, the first indicator 124(1) outputs a first indication (e.g., a green light). If the height $H_1$ is greater than the height $H_2$ of the lines 116, the first indicator 124(1) outputs a second indication (e.g., a red light). As such, the first indicator 124(1) (or other indicators) are used to alert the operator if the height $H_1$ is below the lines 116 and is acceptable to proceed (green), or if the height $H_1$ is at or above the lines 116. In some instances, the height $H_1$ is determined through other systems and/or sensors. For example, a laser may be used to measure the height $H_1$, a clearance bar may indicate whether loads exceed the height $H_2$, and so forth.

In some instances, based on the machine position 140, the indicators 124 display a corresponding indication 144 associated with steering the machine 102. For example, the control system 132 selects one or more of the indicators 124 to display the indication 144. After determining the machine position 140, the control system 132 utilizes the machine position 140 to determine a corresponding indicator 124 to display the indication 144. This includes, for example, selecting a closest indicator 124 to the machine 102, or an indicator that is viewable to the operator (e.g., within a field of view, line of sight, etc.). For example, in FIG. 4, as the operator approaches the second pole 118(2) and the second indicator 124(2), the operator may have a difficult time observing the second indicator 124(2) given the proximate location of the machine 102 to the second indicator 124(2) (or the second pole 118(2)). The dump box 106, for example, may obstruct such view. In such instances, the control system 132 selects the indication 144 to be output on the third indicator 124(3), given that the third indicator 124(3) is more easily observable by the operator. Additionally, or alternatively, the control system 132 outputs the indication 144 on the fourth indicator 124(4). The locations of the poles 118 is determined via the trolley assist data 142 and such locations may be compared against the current machine position 140 to determine which indicator 124 to output the indication 144.

In some instances, the control system 132, as part of determining which indicator 124 to output the indication 144, determines whether the machine position 140 is within a threshold distance of the poles 118, respectively. If the machine position 140 is within the threshold distance (e.g., ten meters), the control system 132 may determine to refrain from displaying the indication 144 on the pole 118 but may select a subsequent pole to output the indication 144.

Moreover, FIG. 4 illustrates that, in some instances, the sensors 126 are arranged to monitor respective regions of interest (e.g., zone, area, section, etc.). For example, the second sensor 126(2) outputs signals 400 in a region of interest 402, between the third pole 118(3) and the first pole 118(1). The sensors 126 may be arranged to output the signals within a region of interest that spans between multiple sets of poles 118, a single set of poles 118, and so forth. For example, an additional sensor may be disposed on the second pole 118(2) and monitor a region of interest between the second pole 118(2) and the first pole 118(1). Here, the second sensor 126(2) as shown in FIG. 4, may monitor a region of interest between the third pole 118(3) and the first pole 118(1). Additionally, or alternatively, a sensor 126 may monitor a region of interest between the fourth pole 118(4) and the first pole 118(1). As such, a sensor may monitor multiple a region of interest that spans between multiple poles 118 (e.g., three, four, five, etc.) or a region of interest that spans between two adjacent poles 118. In such instances, a single sensor 126 may monitor the region of interest, but multiple indicators 124 may be disposed within the region of interest for outputting the indications 144.

In some instances, the regions of interest at least partially overlap. For example, the second sensor 126(2) may refrain, or be unable, to output the signals 400 directly beneath the third pole 118(3). In such instances, the second sensor 126(2) is not arranged to detect the machine position 140 within a threshold distance of the third pole 118(3). Instead, such area is monitored by the third sensor disposed on the fourth pole 118(4), a fifth pole, and so forth. In other words, even though the machine 102 may located in the zone of interest 402 between the third pole 118(3) and the first pole 118(1), whether partially or completely, a third sensor 126 may generates the sensor data 130 for use by the control system 132 in determining the machine position 140. In some instances, all of the sensors 126 generate sensor data 130, and the control system 132 determines the machine position 140 using all of, or a portion of, the sensor data 130. Once the machine position 140 is determined, the control system 132 determines which of the indicators 124 outputs the indication 144.

The sensors 126 are therefore arranged along the haul road 104 for use by the control system 132 in determining the machine position 140. The sensors 126 are respectively arranged to monitor zones of interest along the haul road 104, between adjacent poles 118. As part of determining the machine position 140, the control system 132 determines (or otherwise selects) which indicator 124 is to output an indication 144 indicative of a steering of the machine 102.

Figure 5:
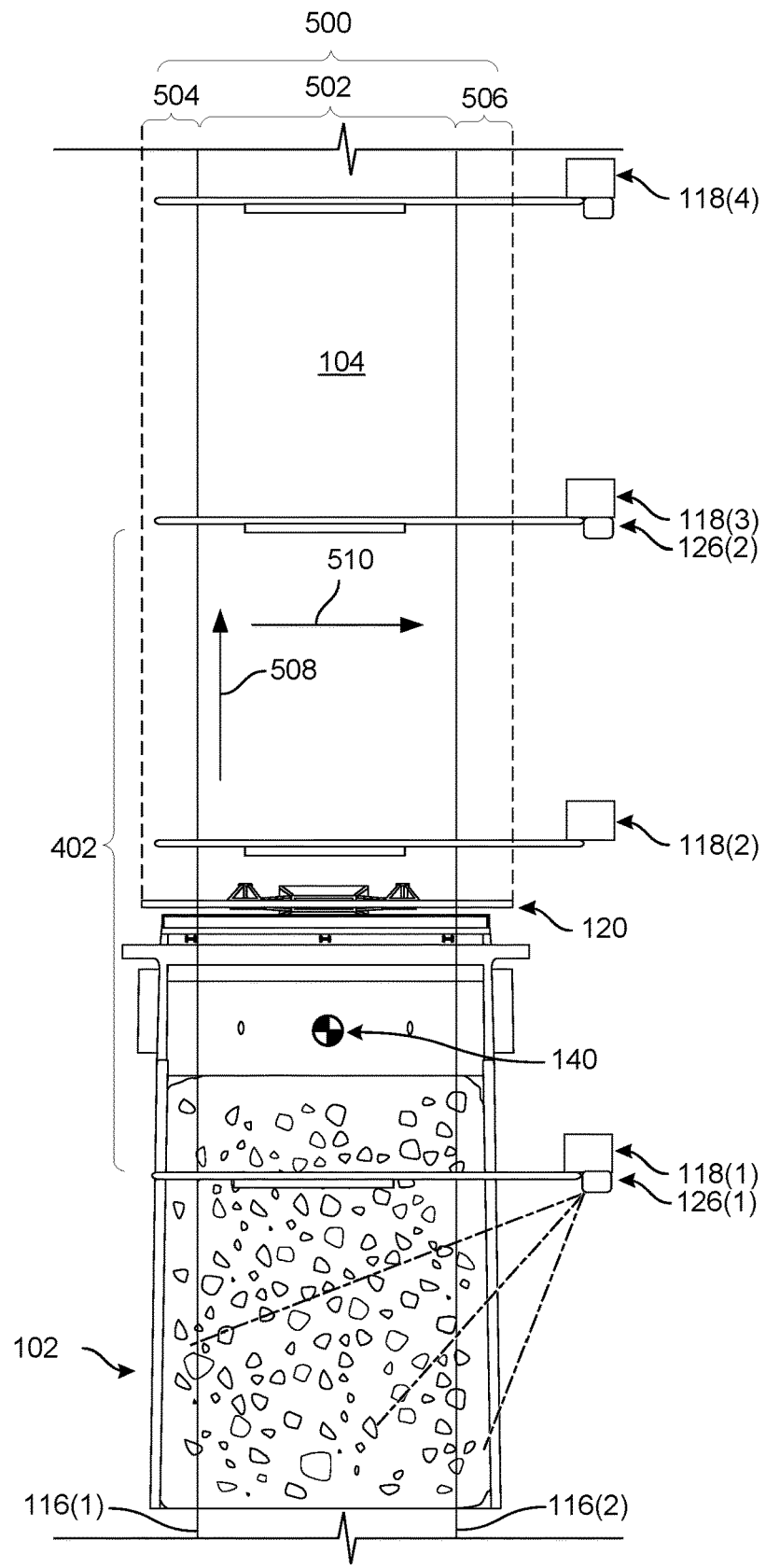
FIG. 5 illustrates example components of a trolley assist for determining a position of a machine, according to an embodiment of the present disclosure.

FIG. 5 illustrates a top view showing the machine 102 traversing the haul road 104. As introduced above with FIG. 4, the sensors 126 are arranged to output signals within respective zones of interest. For example, the second sensor 126(2) outputs the signals 400 in the region of interest 402. In some instances the regions of interest are each associated with a length (in a longitudinal direction 508 relative to a length of the haul road 104), a width (in a lateral direction 510 relative to the length of the haul road 104), and/or a height. As noted above, the region of interest may at least partially overlap with one another. In some instances, the region of interests may include a longitudinal length of approximately between 100 meters and approximately three hundred meters. As such, within this region of interest, multiple poles 118 may be arranged with indicators 124 to output the indications 144, but a single sensor 126 may be used to monitor the region of interest. In such instances, the control system 132 may communicate with a respective indicator for outputting the indication 144.

In the view shown in FIG. 5, the trolley assist attachment 120 is centered on the first line 116(1) and the second line 116(2). The trolley assist attachment 120 includes a first width 500, while a second width 502 extends between the first line 116(1) and the second line 116(2). When centered, the trolley assist attachment 120 is centered on the first line 116(1) and the second line 116(2). Additionally, when centered, the trolley assist attachment 120 (or more generally the machine 102) has a first freedom of travel 504 and a second freedom of travel 506 for maintaining contact between the sliding segment(s) 202 and the lines 116. The first freedom of travel 504 is shown extending between a first end of the trolley assist attachment 120 and the first line 116(1), while the second freedom of travel 506 is shown extending between a second end of the trolley assist attachment 120 and the second line 116(2). Here, the trolley assist attachment 120 may move rightward by an amount less than the first freedom of travel 504 while still maintaining contact with the first line 116(1) and the second line 116(2). Similarly, the trolley assist attachment 120 may move leftward an amount less than the second freedom of travel 506 while still maintaining contact with the first line 116(1) and the second line 116(2). As such, the trolley assist attachment 120 has a certain degree of travel in order to maintain contact with the first line 116(1) and the second line 116(2).

In some instances, the control system 132 determines whether the machine position 140 is misaligned on the haul road 104 based on the machine position 140 veering in either leftward and/or rightward. For example, in FIG. 5, the machine position 140 is shown, where the machine position 140 is associated with a center position of a width of the machine 102. If the machine 102 veers in the rightward direction by an amount greater than the first freedom of travel 504, the trolley assist attachment 120 loses contact with the first line 116(1). If the machine 102 veers in the leftward direction by an amount greater than the second freedom of travel 506, the trolley assist attachment 120 loses contact with the second line 116(2). In some instances, the control system 132 determines whether the machine position 140 has veered in either the rightward direction or the leftward direction by a threshold amount before causing output of the indication. For example, the threshold amount may be a fraction, percentage, or portion of the first freedom of travel 504 and the second freedom of travel 506, respectively.

To illustrate, the first freedom of travel 504 may be one meter and the second freedom of travel 506 may be one meter. As such, in this example, the machine 102 is permitted to drift by a distance of one meter in either lateral direction while still maintaining contact with the first line 116(1) and the second line 116(2). A threshold associated with the first freedom of travel 504 and the second freedom of travel 506 such that if the machine 102 veers by an amount (distance) greater than the threshold, the indication 144 is output. For example, if the machine position 140 veers either rightward or leftward by one-third of a meter, an indication 144 may be output for instructing the operator to steer the machine leftward or rightward, respectively. Otherwise, if the machine position 140 is within one-third of a meter, an indication 144 may be output that is indicative of steering the machine 102 straight.

In some instances, the first freedom of travel 504 and/or the second freedom of travel 506 are adjusted based on wear experienced by the sliding segment(s) 202. Additionally, in some instances, multiple thresholds are associated with outputting the indications 144. For example, if the machine position 140 is two-thirds of a meter from the central position, a different indication 144 is output. At this position, the trolley assist attachment loses contact with the lines 116 if the machine 102 further veers in the direction by one-third of a meter. As such, the scenario is more severe and the indication 144 includes a more attention getting indication (e.g., faster blinking light, different colors, additional lights illuminated, sounds, etc.). Additionally, an alert may be output on a display within the operator station 112.

Therefore, the machine 102 is configured to maintain contact with the trolley assist 114 while traveling within a certain range (e.g., one meter to the left and right). The control system 132 monitors the machine position 140, and if the machine position 140 veers in a direction greater than a threshold amount, the indication 144 is output warning the operator to steer the machine 102 in order to maintain contact with the trolley assist 114. In some instances, the control system 132 monitors whether the machine position 140 has outside the threshold amounts for instituting multiple indications 144 to warn the operator.

Figure 6:
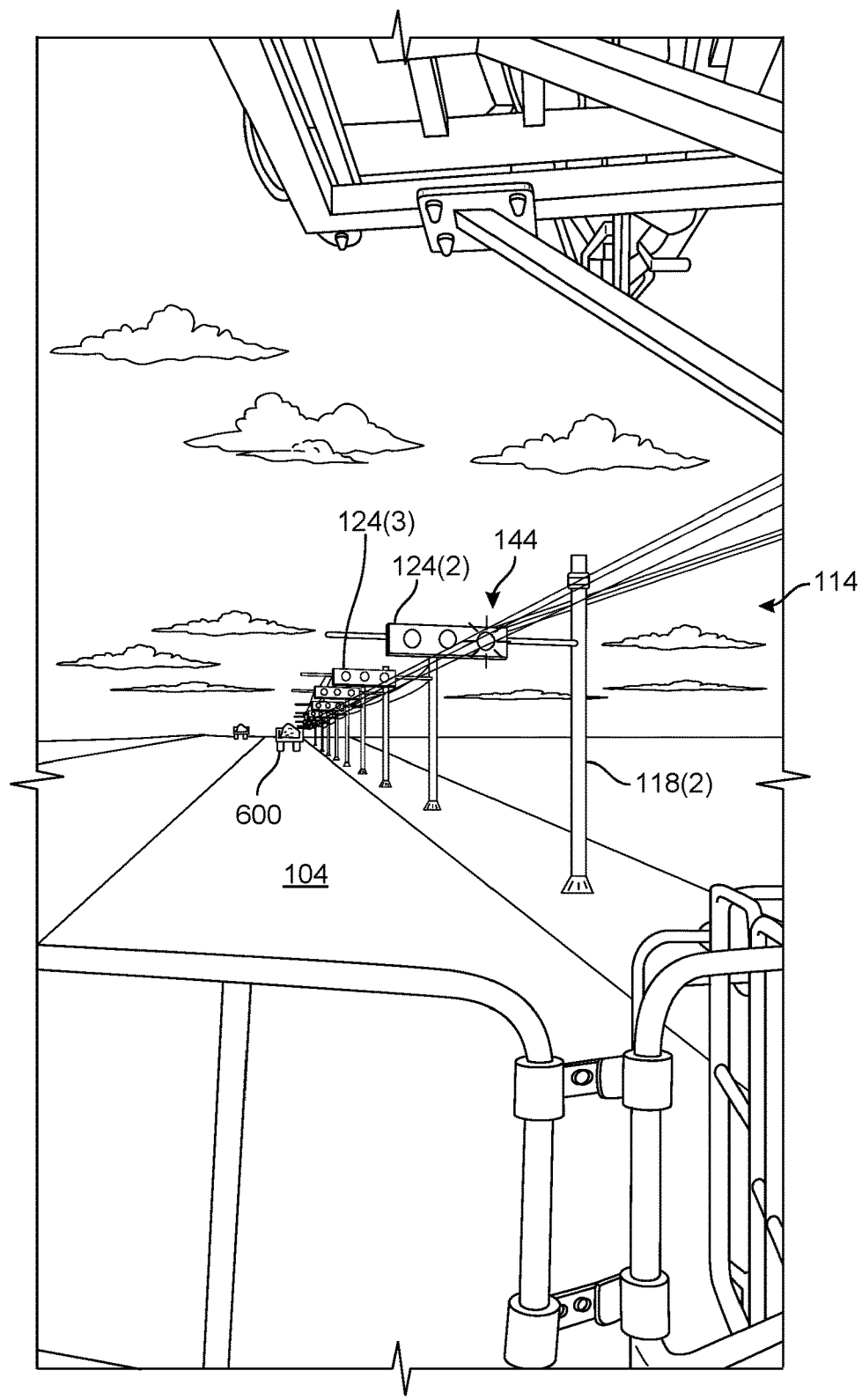
FIG. 6 illustrates an example view from an operator of a machine, along a trolley assist, according to an embodiment of the present disclosure.

FIG. 6 illustrates a view from within the operator station 112, showing the trolley assist 114 and the indicators 124. In FIG. 6, the machine 102 may be positioned beneath the first pole 118(1) and moving in a direction towards the second pole 118(2) along the haul road 104. As shown, the second indicator 124(2) outputs an indication 144 associated with steering the machine 102 rightward, towards the second pole 118(2) or towards a right of the haul road 104. For example, a right-most light of the second indicator 124(2) is illuminated to indicate to the operator to steer the machine 102 to the right. Additionally, or alternatively, the third indicator 124(3) may output an indication as well. For example, depending on the machine position 140 along the length of the haul road 104, the control system 132 may determine an indicator 124 to output the indication 144 to the operator.

As also shown, an additional machine 600 is traversing the haul road 104 in front of the machine 102. The sensors 126 may correspondingly determine the machine position 140 of the additional machine 600 and output corresponding indications 144. In some instances, the control system 132 differentiates between the machine 102 and the additional machine 600 given the spacing of the machine 102 and the additional machine 600 along the length of the haul road 104. In some instances, differentiating between the machine 102 and the additional machine 600 may come by way of identifiers (e.g., numbers, characters, etc.) located on the machine 102 and the additional machine 600, and image analysis techniques (e.g., feature extraction) are used to identify such identifiers for differentiating between the machine 102 and the additional machine 600 (as well as additional machines).

Therefore, as the machine 102 (and other machines travel along the haul road 104), the indicators 124 output indications 144 for steering the machine 102 on the haul road 104. Such indications 144 assist the operator with steering the machine 102 and thereby maintaining contact between the trolley assist attachment and the trolley assist 114. The indicators 124 that are selecting for outputting the indications 144 is based on the machine position 140 such that the indications 144 are capable of being viewable by the operator of the machine 102.

Figure 7:
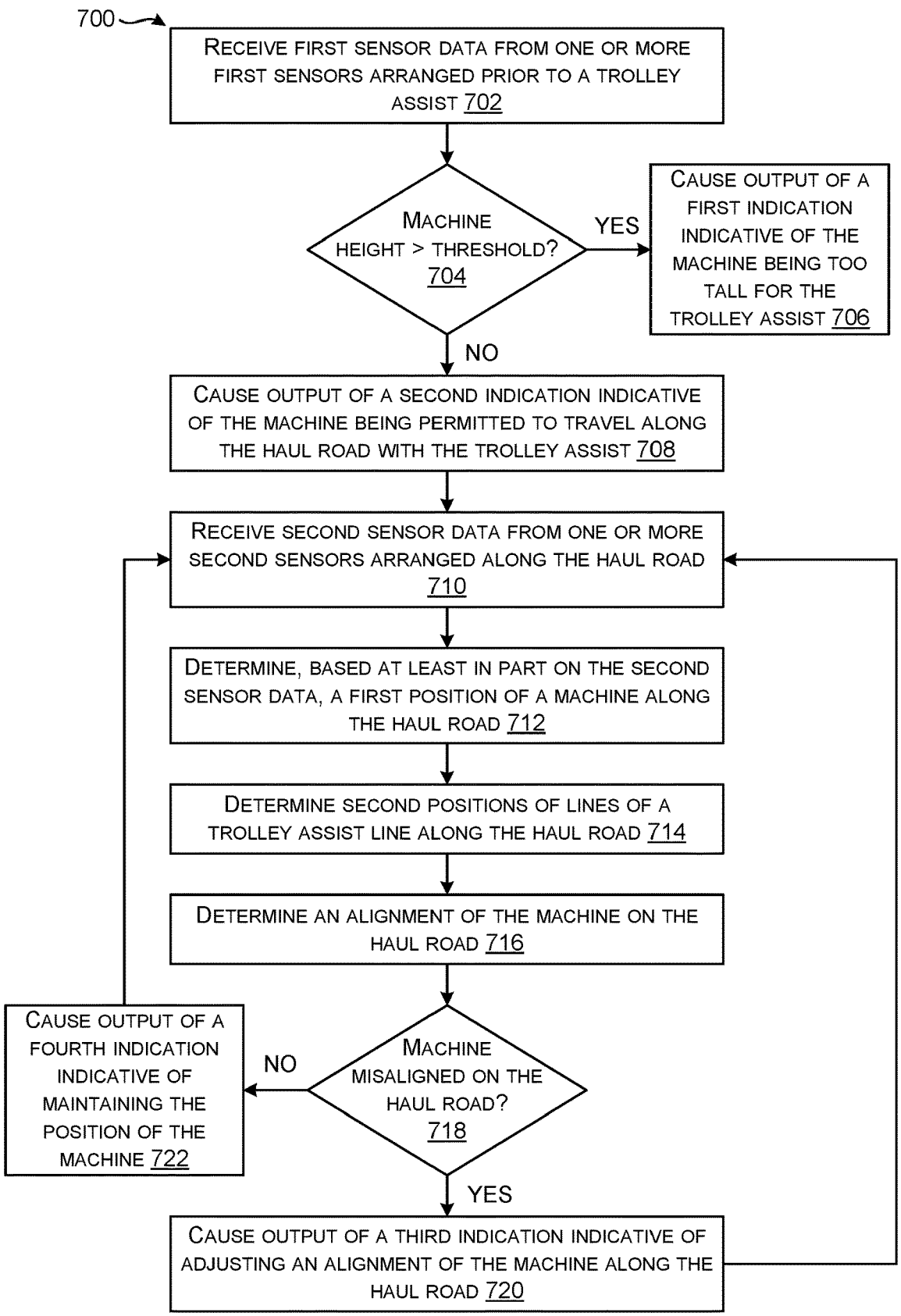
FIG. 7 illustrates a flow chart representing an example process for determining a position of a machine along a trolley assist and outputting a notification for maintaining an alignment of the machine on the trolley assist, according to an embodiment of the present disclosure.
Figure 8:
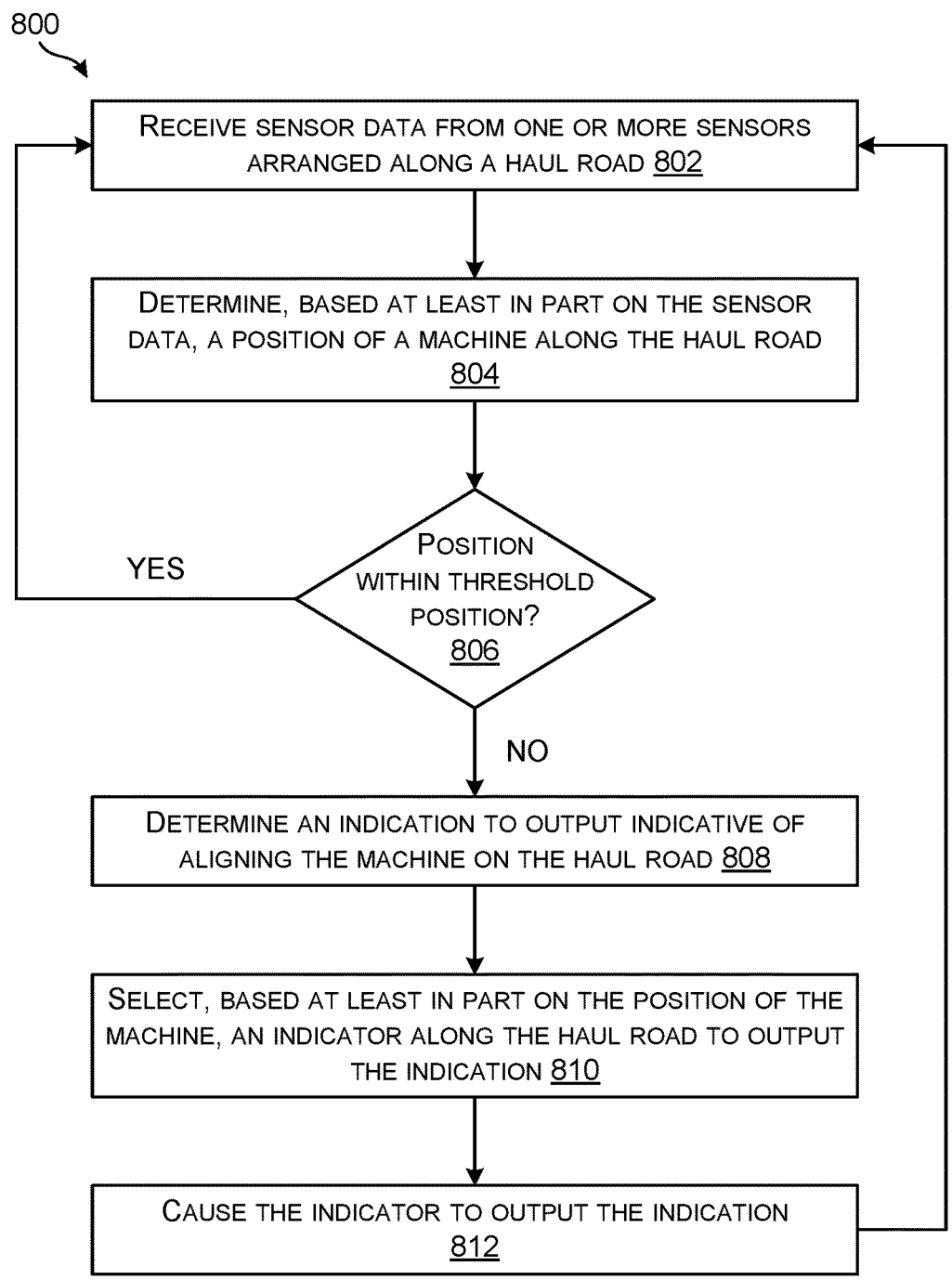
FIG. 8 illustrates another flow chart representing an example process for determining whether to output a notification for maintaining an alignment of the machine on the trolley assist, according to an embodiment of the present disclosure.

FIGS. 7 and 8 illustrate various processes related to determining a position of the machine 102 along the haul road 104, and determining whether to output indications 144 for steering the machine 102 to maintain contact between the trolley assist attachment 120 and the trolley assist 114. The processes described herein are illustrated as collections of blocks in logical flow diagrams, which represent a sequence of operations, some or all of which may be implemented in hardware, software, or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS. 1-6, although the processes may be implemented in a wide variety of other environments, architectures and systems.

FIG. 7 illustrates an example process 700 for causing output of an indication in instances where the machine 102 is misaligned on the haul road 104.

At 702, the system controller 146 receives first sensor data from one or more first sensors arranged prior to a trolley assist 114. The first sensor data, for example, may be arranged to monitor a portion of a haul road that is prior to the trolley assist 114. For example, the first sensor data may be generated by a first sensor that is arranged on a first pole 118(1) to monitor a load height of the machine 102. The first sensor data may be indicated of the load height of the machine 102, and a load carried by the machine 102 in the dump box 106.

At 704, the system controller 146 may determine whether the machine height is greater than a threshold. For example, using the first sensor data and the determined height of the machine 102 and the load (e.g., height $H_1$), the system controller 146 determines whether the height is greater than the height of the lines 116 (e.g., height $H_2$). If at 704, the system controller 146 determines that the height $H_1$ is greater than the height $H_2$, the system controller 146 at 706 may cause output of a first indication indicative of the machine being too tall for the trolley assist ("YES" route from 704). For example, in instances where the height $H_1$ is greater than the height $H_2$, the machine 102 may be at risk of contacting the lines 116 along the haul road 104 if allowed to proceed. The first indication, for example, may be a red light, text, and so forth. In some instances, the system controller 146 displays the indication 144 on a first indicator (e.g., the first indicator 124(1)) along the haul road 104 indicating that it is not safe for the machine 102 to proceed.

Comparatively, if at 704 the system controller 146 determines that the machine height is less than the threshold, the system controller 146 outputs a second indication at 708 indicative of the machine being permitted to travel along the haul road with the trolley assist ("NO" route from 704). For example, the second indication, may be green light, text, and so forth. In some instances, the system controller 146 displays the indication 144 on a first indicator (e.g., the first indicator 124(1)) along the haul road 104 indicating that it is safe for the machine 102 to proceed.

At 710, the system controller 146 receives second sensor data from one or more second sensors arranged along a haul road 104. For example, the system controller 146 receives the sensor data 130 from the sensors 126. The sensor data 130 may represent reflect light waves (or signals) emitted by the sensors 126 (e.g., LIDAR). As such, the light waves are emitted and returned to the sensors 126, respectively, for determining objects along the haul road 104. In some instances, the sensors 126 are positioned on poles 118 arranged and spaced apart from one another along the length of the haul road 104.

At 712, the system controller 146 determines, based at least in part on the second sensor data, a first position of a machine along the haul road 104. For example, the system controller 146 may analyze the sensor data 130 to determine whether objects, such as the machine 102, were detected along the haul road 104. As part of this, the system controller 146 may identify a distance between the sensors 126 and the machine 102, surfaces of the machine 102, and so forth. Using this identification, the system controller 146 determines a width of the machine 102, a length of the machine 102, a height of the machine 102, and/or other characteristic(s) of the machine 102. Such characteristic(s) enable the system controller 146 to identify the type of the machine 102 as well as a position (e.g., laterally) of the machine 102 on the haul road 104. In some instances, the system controller 146 determines characteristic(s) (e.g., size, width, etc.) of the trolley assist attachment 120 onboard the machine 102. In some instances, the first position of the machine 102 is expressed as a lateral position of the machine 102 across a width of the haul road 104 or relative to the trolley assist 114.

At 714, the system controller 146 determines second positions of lines of a trolley assist along the haul road 104. For example, the system controller 146 may access the trolley assist data 142 to determine characteristic(s) of the trolley assist 114. Such characteristic(s), for example, may indicate a spacing between the lines 116 of the trolley assist 114 in which the trolley assist attachment 120 contacts. In some instances, the second positions may be representative of a central point between the first line 116(1) and the second line 116(2).

At 716, the system controller 146 determines an alignment of the machine on the haul road 104. For example, the system controller 146 references the first position of the machine 102 with the second positions of the lines 116. Such reference, for example, indicates whether the position of the machine 102 is misaligned with the trolley assist 114. In some instances, the alignment is expressed in terms of how off center the position of the machine 102 is from the central point between the first line 116(1) and the second line 116(2). For example, the alignment may indicate that the position of the machine 102 is one-half of a meter to the left of the central point between the first line 116(1) and the second line 116(2). As such, the system controller 146 may utilize the sensor data 130 as a way to determine the position of the machine 102, and compare such position to known positions of the first line 116(1) and the second line 116(2).

At 718, the system controller 146 determines whether the machine 102 is misaligned on the haul road 104. For example, the system controller 146 determines whether the alignment of the machine 102 on the haul road 104 is outside a threshold amount (e.g., tolerance). In some instances, the machine 102 is permitted to veer rightward and/or leftward on the trolley assist 114 while still maintaining contact between the trolley assist attachment 120 and the trolley assist 114. However, if the machine 102 veers outside of acceptable amounts, for example, greater than threshold amounts, the trolley assist attachment 120 may be in jeopardy of losing contact with the trolley assist 114. In some instances, whether the machine 102 is misaligned on the haul road 104 is based on a comparison of the first position of the machine 102, and whether the first position of the machine 102 is greater than threshold amounts. For example, if the position of the machine 102 off center by greater than one-third of a meter (whether to the left or to the right), the system controller 146 may determine that the machine 102 is misaligned on the haul road 104. Alternatively, if the system controller 146 determines that the machine 102 is within one-third of a meter of the center (whether to the left or to the right), the system controller 146 determines that the machine 102 is aligned on the haul road 104.

If at 718 the system controller 146 determines that the machine 102 aligned, the system controller 146 may at 720 cause output of a third indication indicative of adjusting an alignment of the machine along the haul road ("YES" route from 718). For example, based on the first position of the machine 102, the system controller 146 determines in which direction the machine 102 is off center. As an example, the system controller 146 determines whether the machine 102 needs to be steered left or right to recenter the machine 102 on the haul road 104. In some instances, the system controller 146 compares the position of the machine 102 with that of the first line 116(1) and the second line 116(2) (or a central position thereof) for determining how the machine 102 needs to be steered to align the machine 102 on the haul road 104.

The third indication is output on at least one indicator along the haul road 104. For example, as part of determining the indication 144, the system controller 146, in some instances, determines which indicator 124 is to output the indication 144. Such determination may be based on the position of the machine 102 and a line of the sight of the machine 102. For example, if the position of the machine is within a certain threshold of the pole 118 or indicator 124, such as ten meters, the indication 144 may be output on a subsequent indicator 124. The indication 144, for example, represents a light emitted by the indicator 124, where the light is indicative of a direction of steering to align the machine 102 on the haul road 104. Other indications 144, such as a directional arrows, blinking lights, and so forth may be output by the indicator 124. Additionally, in some instances, more than one indicator 124 may output the indication 144. From 720, the system controller 146 continues to receive the sensor data 130 at 710 from the sensors 126 (whether other sensors 126 or the same sensor) to assist maintaining an alignment of the machine 102 on the haul road 104.

Comparatively, if the system controller 146 determines at 718 that the machine is not misaligned, the system controller 146 at 722 causes output of a fourth indication indicating that the machine 102 is not misaligned, or is within the threshold amount of the central location ("NO" route from 718). As such, the system controller 146 may cause output of an indication 144 indicative of steering the machine 102 straight (e.g., illuminate middle light of the indicator 124). From 722, the system controller 146 continues to receive the sensor data at 710 for aligning the machine along the trolley assist 114.

In some instances, the system controller 146 determines the first position of the machine 102 using sensor data 130 received across the sensors 126, or from a closest sensor to the machine 102. The process 700 is described with regard to determining a position of the machine 102, however, the system controller 146 is configured to determine respective positions of machines 102 along the haul road 104 and output respective indications for aligning the machines 102 on the haul road 104, respectively. Additionally, although the above discussion is with regard to determining an alignment of the machine 102 on the haul road 104, the system controller 146 may additionally or alternatively determine an alignment of the trolley assist attachment 120 on the trolley assist (or the first line 116(1) and the second line 116(2)) when determining the indications 144 to be output.

FIG. 8 illustrates an example process 800 associated with determining whether to output an indication indicative of steering a machine to maintain contact with a trolley assist 114.

At 802, the system controller 146 receives sensor data from one or more sensors arranged along a haul road 104. For example, the system controller 146 receives the sensor data 130 from the sensors 126. The sensor data 130 may represent reflect light waves (or signals) emitted by the sensors 126 (e.g., LIDAR). In some instances, the sensors 126 are positioned on poles 118 arranged and spaced apart from one another along the length of the haul road 104.

At 804, the system controller 146 determines, based at least in part on the sensor data, a position of a machine along the haul road 104. For example, the system controller 146 analyzes the sensor data 130 to determine whether objects, such as the machine 102, were detected along the haul road 104. As part of this, the system controller 146 may identify a distance between the sensors 126 (or surfaces thereof) and/or characteristic(s) of the machine 102 (e.g., width, length, etc.). For example, the system controller 146 may compare the characteristic(s) of the machine 102 with those stored in the machine registry 138 to identify the machine 102. Such identification may include determining a central position of the machine 102. This central position is used, in some instances, to determine a lateral position of the machine 102 across a width of the haul road 104 or relative to the trolley assist 114. That is, knowing the center of the machine 102 allows for the center of the machine 102 to be expressed across the of the haul road 104.

At 806, the system controller 146 determines whether the position is within a threshold zone. For example, system controller 146 determines whether the position of the machine is aligned with a central position between the first line 116(1) and the second line 116(2). In some instances, the threshold position is associated with a certain freedom of travel in rightward and leftward directions. For example, if the position of the machine 102 is within one-third of a meter of the central position between the first line 116(1) and the second line 116(2), the system controller 146 may determine that the machine 102 is aligned on the haul road 104. However, if the position of the machine 102 is not within one-third of a meter of the central position between the first line 116(1) and the second line 116(2), the system controller 146 may determine that the machine 102 is misaligned on the haul road 104. One-third of a meter is merely illustrative, and the machine 102 may have a less or greater freedom of travel in leftward and/or rightward directions such that the trolley assist attachment 120 maintains contact with the trolley assist 114.

If at 806 the system controller 146 determines that the position is within the threshold position, the system controller 146 receives additional sensor data 130 at 802 to continue to monitor a position of the machine 102 along the haul road ("NO" route from 806). Alternatively, the system controller 146 determines, at 808, an indication to output indicative of aligning the machine on the haul road 104 ("YES" route from 806). For example, based on the position of the machine 102 and the central position between the first line 116(1) and the second line 116(2), the system controller 146 determines in which direction the machine 102 is to be steered. As an example, the system controller 146 determines whether the machine 102 needs to be steered left or right to recenter the machine 102 on the haul road 104.

At 810, the system controller 146 selects, based at least in part on the position of the machine, an indicator along the haul road 104 to output the indication. For example, the system controller 146 selects an indicator to output the indication 144, where the indicator 124 is selected based on the position of the machine 102. The indicator 124 is selected such that the output is capable of being viewed by the operator of the machine 102. For example, if the indication 144 is displayed too close to or too far from the operator, the operator may be unable to view the indication 144. In some instances, the system controller 146 selects the nearest indicator 124 to output the indication, unless the machine 102 is within a threshold distance of the indicator 124, in which case, the system controller selects the subsequent indicator 124 on the haul road 104 to output the indication 144.

At 812, the system controller 146 causes output of the indication on the indicator along the haul road 104. The indication 144, for example, represents light emitted by the indicator 124, where the light is indicative of a direction of steering to align the machine 102 on the haul road 104. Other indications 144, such as a directional arrows, blinking lights, and so forth may be output by the indicator 124.

Although the process 800 illustrates a comparison of the position to a single threshold, in some instances, the system controller 146 compares the position to multiple thresholds for determining the indication 144 to be output. The indication 144, for example, may indicate a severity of steering the machine 102 to align the machine 102 on the haul road 104. Although the above discussion is with regard to determining an alignment of the machine 102 on the haul road 104, the system controller 146 may additionally or alternatively determine an alignment of the trolley assist attachment 120 on the trolley assist (or the first line 116(1) and the second line 116(2)) when determining the indications 144 to be output.

INDUSTRIAL APPLICATION

The present disclosure describes monitoring a position of a machine along a trolley assist such that a trolley assist attachment of machine maintains contact with lines of the trolley assist. For example, along a portion of a haul road, lines of the trolley assist may be located overhead. Sensors are positioned along the portion of the haul road for use in determining a location of the machine. Indicators are displayed to an operator of the machine such that the trolley assist maintains contact with the lines. The indicators, for example, may indicate to the operator to steer left, steer right, or maintain course. In this manner, the operator is provided visual cues for aligning the machine along the trolley assist.

By maintaining contact with the trolley assist the machine has reduced carbon emissions, lower fuel and engine costs, and an increased speech along the haul road. Additionally, productivity is increased. For example, as the trolley assist may be located along steep includes, the machines have greater accessibility to deeper parts of a mine and the machines are able to traverse higher gradients and operate at full load for longer periods. Because the machines are powered via electricity supplied by the trolley assist along these portions, there is a reduction in maintenance costs on the engine that are otherwise experienced during operation. As a result, the machines have increased availability and a decreased life cycle costs for the diesel engine.

Moreover, the sensors are disposed on the poles, which in some instances, limits an amount of resources spent installing like sensors on the machines. For example, rather than disposing the sensors on the machines, installing the sensors on the poles reduces an overall amount of sensors disposed along the haul road and the machines. Locating the sensors on the poles may also reduce or eliminate damage to the sensors, compared to the harsh conditions experienced by the machines. Additionally, the sensors may be easily serviced on the poles, as compared to the machines. This may additionally improve the productivity of the machine and lead to less downtime. Further, by disposing the indication on the poles, the operators of the machine maintain their attention on the haul road, thereby increasing safety.

Although the systems and methods are discussed in the context of a mining operation, the systems and methods discussed herein may be applied to a wide array of machines and vehicles across a wide variety of industries, such as construction, paving, farming, transportation, military, combinations thereof, or the like.

While the foregoing invention is described with respect to the specific examples, the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, the claims are not necessarily limited to the specific features or acts described. Rather, the specific features and acts are merely illustrative some embodiments that fall within the scope of the claims of the application.

What is claimed is:

1. A system, comprising:
   a support;
   a sensor coupled to the support and disposed above a haul road on which a machine is disposed;
   an indicator coupled to the support;
   a first power line coupled to the support;
   a second power line coupled to the support and spaced from the first power line, the first power line and the second power line being suspended above the haul road;
   one or more processors; and
   non-transitory computer-readable media storing instructions that, when executed by the one or more processors, cause the one or more processors to perform operations comprising:
   receiving sensor data from the sensor;
   determining, based at least in part on the sensor data, a position of the machine on the haul road;
   determining, based at least in part on the position, whether a power component of the machine is in contact with the first power line and the second power line;
   based at least in part on determining whether the power component is in contact with the first power line and the second power line, selecting an alignment indication indicative of a desired lateral movement of the machine along the haul road; and
   causing output of the alignment indication by the indicator.

2. The system of claim 1, wherein determining the alignment indication is associated with the power component maintaining contact with the first power line and the second power line.

3. The system of claim 1, wherein the machine includes one or more pantographs that vertically lift the power component into contact with the first power line and the second power line.

4. The system of claim 1, wherein:
   the indicator comprises one or more light elements; and
   the alignment indication is associated with causing a light element of the one or more light elements to illuminate, the light element being indicative of a steering direction of the machine.

5. The system of claim 1, the operations further comprising determining that the position of the machine is outside a threshold range for maintaining contact between the power component, the first power line, and the second power line, and wherein determining the alignment indication is further based at least in part on the position of the machine being outside of the threshold range.

6. The system of claim 1, wherein the sensor data comprises first sensor data, the position of the machine comprises a first position of the machine, the alignment indication comprises a first alignment indication, and the desired lateral movement comprises a first desired lateral movement, the operations further comprising:
   receiving second sensor data from the sensor;
   determining, based at least in part on the second sensor data, a second position of the machine on the haul road;
   determining, based at least in part on the second position, whether the power component of the machine is in contact with the first power line and the second power line;
   based at least in part on determining whether the power component is in contact with the first power line and the second power line, selecting a second alignment indication indicative of a second desired lateral movement of the machine along the haul road; and
   causing output of the second alignment indication by the indicator.

7. The system of claim 6, wherein the indicator comprises a first indicator, the operations further comprising causing output of the second alignment indication on a second indicator based at least in part on the second position of the machine.

8. A method, comprising:
   receiving sensor data indicative of a machine traveling along a road;
   determining, based at least in part on the sensor data, a first position of the machine on the road, the machine having a trolley assist attachment configured to contact a first line and a second line of a trolley assist positioned along the road;
   determining at least one of a second position of the first line or a third position of the second line;
   determining, based at least in part on the first position and the at least one of the second position or the third position, an indication to be output on an indicator positioned along the road; and
   causing output of the indication on the indicator.

9. The method of claim 8, wherein the first position is indicative of an alignment of the trolley assist attachment with the trolley assist to maintain contact between the trolley assist attachment, the first line, and the second line.

10. The method of claim 8, wherein the indication is indicative of a steering direction of the machine to maintain contact between the trolley assist attachment, the first line, and the second line.

11. The method of claim 8, wherein:
the indicator comprises one or more light elements; and
the indication is associated with causing a light element of the one or more light elements to illuminate.

12. The method of claim 8, further comprising:
receiving second sensor data indicative of the machine traveling along the road;
determining, based at least in part on the second sensor data, a second position of the machine on the road; and
based at least in part on the second position causing a second indication to be displayed on the indicator for aligning the machine on the road.

13. The method of claim 8, further comprising:
determining a fourth position of the indicator along the road; and
determining, based at least in part on the first position and the fourth position, to output the indication on the indicator.

14. The method of claim 8, wherein:
the trolley assist attachment includes a first width;
the trolley assist includes a second width between the first line and the second line; and
the first position is associated with the first width of the trolley assist attachment being centered on the second width of the trolley assist.

15. The method of claim 8, further comprising:
determining a second position indicative of a central position between the first line and the second line;
determining a threshold range associated with the central position for causing output of the indicator; and
determining that the second position is outside of the threshold range,
wherein causing output of the indication on the indicator is based at least in part on determining that the second position is outside of the threshold range.

16. A system, comprising:
one or more processors; and
one or more non-transitory computer-readable media storing instructions that, when executed by the one or more processors, cause the one or more processors to perform operations comprising:
receiving sensor data indicative of a machine traveling along a road;
determining, based at least in part on the sensor data, a first position of the machine on the road, the machine having a trolley assist attachment configured to contact a first line and a second line of a trolley assist positioned along the road;
determining a second position indicative of a central position between the first line and the second line; and
determining, based at least in part on the first position and the second position an indication to be output on an indicator positioned along the road.

17. The system of claim 16, the operations further comprising determining that the first position is greater than a threshold amount away from the second position, and wherein determining the indication to be output on the indicator is based at least in part on the first position being greater than the threshold amount away from the second position.

18. The system of claim 16, wherein the indication is indicative of a steering of the machine to laterally align the machine on the road.

19. The system of claim 16, wherein:
the indicator comprises one or more light elements; and
the indication is associated with causing a light element of the one or more light elements to illuminate.

20. The system of claim 16, the operations further comprising:
receiving second sensor data indicative of the machine traveling along the road;
determining, based at least in part on the second sensor data, a third position of the machine on the road; and
determining, based at least in part on the second position and the third position, a second indication to be output on the indicator positioned along the road.

* * * * *